UNITED STATES PATENT OFFICE.

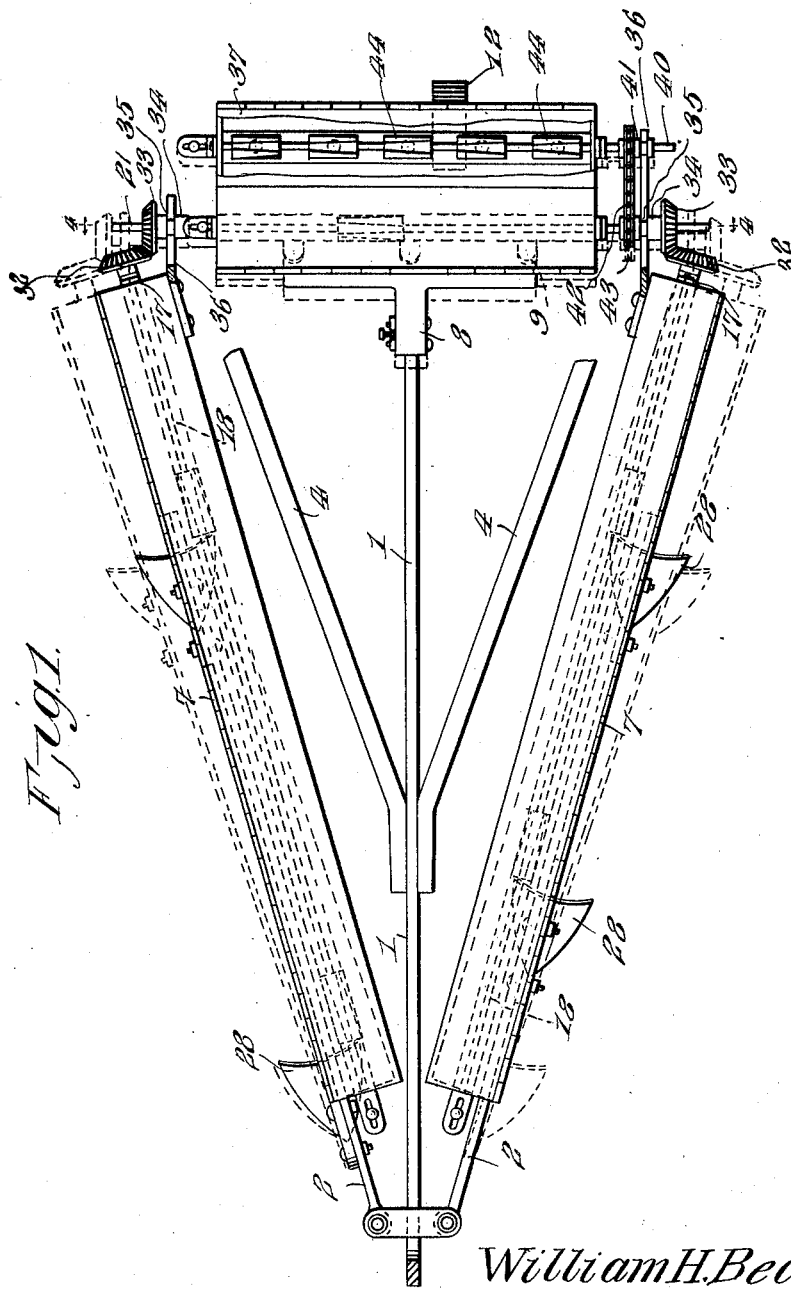

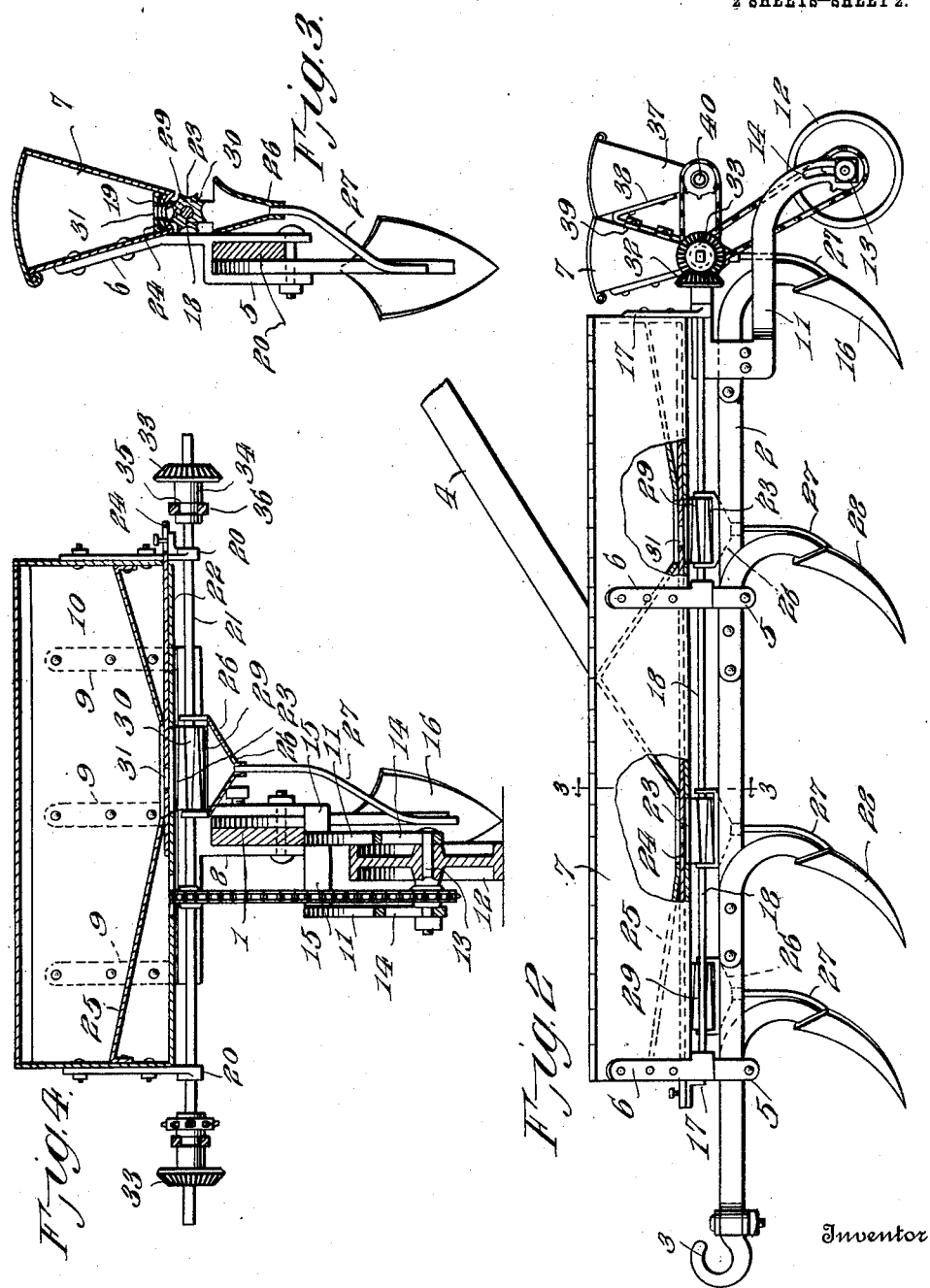

WILLIAM H. BECKETT, OF LANHAM, MARYLAND.

SEED-DISTRIBUTER.

1,002,800.     Specification of Letters Patent.     Patented Sept. 5, 1911.

Application filed February 21, 1911. Serial No. 609,905.

*To all whom it may concern:*

Be it known that I, WILLIAM H. BECKETT, a citizen of the United States of America, residing at Lanham, in the county of Prince George and State of Maryland, have invented new and useful Improvements in Seed-Distributers, of which the following is a specification.

This invention relates to seed planters or distributers, and it has for its object to provide a seed distributing attachment or device which may be readily applied to and used in connection with an ordinary walking cultivator for the purpose of depositing the seed either in drills or broadcast, as may be desired.

A further object of the invention is to provide a device of the class described having simple and efficient means for gaging or regulating the quantity of seed deposited.

A further object of the invention is to provide a simple and efficient device of the character described which will admit of adjustment of the cultivator to permit expansion or contraction of the same without interfering with the operation or efficiency of the planter or seed distributer.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view showing the invention applied to a walking cultivator of ordinary well known construction. Fig. 2 is a side elevation partly in section. Fig. 3 is a transverse sectional view taken on the line 3—3 in Fig. 2. Fig. 4 is a vertical transverse sectional view taken on the line 4—4 in Fig. 1.

Corresponding parts in the several figures are denoted by like characters of reference.

The cultivator in connection with which the invention is used includes a center beam 1 and side beams 2, 2, the latter being hingedly connected with the center beam near the front end of the latter in any convenient and well known manner. The center beam is provided at its front end with a hook member 3 for the attachment of the draft, and handles 4, 4 by means of which the machine may be guided are suitably connected with the center beam 1. Means may be provided for maintaining the side beams 2 in various adjusted positions with reference to the center beam 1, but such means are well known, and as they are no part of the present invention, they have been omitted from the drawing.

Each of the side beams 2 is provided with clamps 5 having upwardly extending arms 6 upon which elongated seed boxes or hoppers 7 may be bolted or otherwise secured, one seed box being thus connected with each beam.

The center beam 1 is provided with a specially constructed clamping device 8 having arms 9 upon which a seed box or hopper 10 is bolted or otherwise secured, said seed box being disposed transversely of the beam 1. The clamping device 8 supports a pair of rearwardly extending and downwardly curved arms 11 carrying an earth engaging wheel 12 which is supported for rotation upon the axle member 13 which is vertically adjustable in slots 14 in the downturned portions of the arms. The arms 11 are provided intermediate their ends with laterally offset portions 15, best seen in Fig. 4 of the drawings, whereby the earth engaging wheel will be offset to one side of the earth engaging blade 16 carried by the beam 1.

The seed boxes 7 which are longitudinally disposed upon the side beams 2, 2 of the cultivator are each provided adjacent to their ends with bearings 17 for a shaft 18 which is disposed beneath the bottom 19 of the seed box. The seed box or hopper 10, which is supported transversely upon the center beam 1 of the cultivator, is likewise provided adjacent to the ends thereof with bearings 20 for a shaft 21 which is disposed beneath the bottom 22 of said seed box. The bottom members 19 and 22 of the hoppers 7 and 10 are provided with suitably arranged apertures 23 for the passage of seed, and suitably arranged adjacent to the upper side of each of said bottom members is an apertured slide 24, whereby the passage of seed may be regulated. The seed boxes may be provided with suitably arranged inclined planes 25 to guide the seed in the direction of the seed apertures. Supported upon the shafts 18 and 21 below and adjacent to the seed apertures are funnel-shaped chutes 26 provided with ducts or tubes 27 through which seed may be guided to a suitable discharge point in rear of the cultivator blades 16 and 28 carried by the center beam 1 of the side beams 2, 2, respectively. The shafts 18 and 21 are also equipped adjacent to the seed apertures in the bottom members of the hoppers with feed rollers or cylinders 29 which are coextensive with the seed apertures 23 in said bottom members. These feed rollers or cylinders are provided with longitudinal tapering grooves or riffles 30, the transverse area of which gradually increases from one end of the roller or cylinder to the other end. The apertures 31 in the slides 24 are considerably smaller than the apertures 23 in the bottom members of the hoppers, and it will be seen that by adjustment of the slides 24, the apertures 31 in said slides may be moved longitudinally of the feed rollers or cylinders so as to place said apertures in juxtapositon to portions of the tapering grooves of greater or lesser area and, therefore, of greater or lesser seed holding capacity. Thus, by so adjusting the seed slides as to place the apertures 31 adjacent to the ends of the feed rollers in the direction of which the seed receiving grooves 30 are contracted, relatively small portions of seed will be fed by the rotation of the shafts carrying the rollers into the chutes 26 from which the seed is carried to the ground, while by adjusting the seed slides to move the apertures 31 in the direction of the rollers having the large ends of the grooves 30, the quantity of the seed deposited by the device will be increased. By this simple construction it has been found that the quantity of seed distributed by the device may be very conveniently gaged with sufficient accuracy for all practical purposes.

The shafts 18 associated with the seed boxes or hoppers 7 are provided adjacent to their rear ends with bevel pinions 32 adapted to mesh with bevel pinions 33 upon the shaft 21 which is associated with the hopper 10. The bevel pinions 33 are slidably mounted upon non-circular portions of the shaft 21, and said bevel pinions are provided with hubs 34 having annular grooves 35 engaged by forked arms 36 that extend rearwardly from the hoppers or seed boxes 7.

It will be observed that when it is found necessary to adjust the cultivator beams 2, 2 for the purpose of increasing or decreasing the width of the path of the cultivator, the forked arms 36 will automatically adjust the bevel gears 33 upon the shaft 21 so as to retain said bevel gears in mesh with the bevel pinions 32 at the rear ends of the shafts 18. When such adjustment is made it also becomes necessary to loosen the clamp member 8 upon the beam 1 to enable the seed box carried by said clamp member to be moved slightly in a forward or rearward direction as may be needed to maintain the bevel gears 33 in mesh with the bevel pinions 32.

In Figs. 1 and 2 of the drawings has been shown an auxiliary seed box or hopper 37 having hook members 38 engaging keepers 39 upon the rear wall of the seed box 7 upon which the said auxiliary seed box or hopper may thus be detachably mounted. The seed box 37 is equipped with bearings for a shaft 40 having a sprocket wheel 41 adapted to be connected by a chain 42 with a sprocket wheel 43 upon the hub of one of the bevel gears 33 from which motion may thus be transmitted to the shaft 40. The latter carries a plurality of feed rollers 44 which are placed so closely together that seed distributed thereby will be scattered broadcast. The rollers 44 and associated parts are constructed precisely like the seed dropping mechanism associated with the seed boxes or hoppers 7 and 10, excepting that the seed chutes 26 and ducts 27 are, of course, omitted.

From the foregoing description it will be seen that I have provided a simple and efficient device capable of being readily applied to and used in connection with an ordinary walking cultivator for the purpose of distributing seeds of various kinds.

Having thus described the invention, what is claimed as new, is:—

1. The combination with a cultivator having a center beam and side beams adjustably connected therewith; of seed boxes mounted longitudinally upon the side beams, a seed box mounted upon the center beam, operating shafts in the several seed boxes, means for actuating the shaft in the seed box upon the center beam, and means for transmitting motion from said shaft to the shafts in the longitudinally disposed seed boxes upon the side beams.

2. A seed distributing attachment for cultivators comprising longitudinally disposed forwardly converging seed boxes and an intermediate seed box, operating shafts in the several seed boxes, means for actuating the shaft in the intermediate seed box, and means for transmitting motion from said operating shaft to the operating shafts in the longitudinally disposed converging seed boxes.

3. The combination with a cultivator having a center beam and side beams adjustably connected therewith; of seed boxes mounted longitudinally upon the side beams, a seed box mounted transversely upon the center beam, operating shafts in the several seed boxes, means for actuating the shaft in the transversely disposed seed box upon the center beam, and means for transmitting motion from said shaft to the shafts in the longitudinally disposed seed boxes upon the side beams.

4. A seed distributing attachment for cultivators including two longitudinally disposed forwardly converging seed boxes and a transversely disposed seed box arranged adjacent to the divergent ends of the longitudinally disposed seed boxes, operating shafts in the several seed boxes, means for actuating the shaft in the transversely disposed seed box, and means for transmitting motion from said operating shaft to the operating shafts in the longitudinally disposed seed boxes.

5. A seed distributing attachment for cultivators including two longitudinally disposed and forwardly convergent seed boxes, a transversely disposed seed box arranged adjacent to the divergent ends of the longitudinally disposed seed boxes, operating shafts in the several seed boxes, means for actuating the operating shaft in the transversely disposed seed box, bevel gears disposed slidably upon said shaft and having hubs provided with annular grooves, forked brackets extending from and connected with the longitudinally disposed seed boxes and engaging the annularly grooved hubs of the bevel gears upon the operating shaft in the transversely disposed seed box, operating shafts in the longitudinally disposed seed boxes, and bevel gears upon said operating shafts meshing with the slidable bevel gears upon the operating shaft in the transversely disposed seed boxes.

In testimony whereof I affix my signature in presence of two witnesses.

WILLIAM H. BECKETT.

Witnesses:
E. EDMONSTON, Jr.
K. DELABAR.

Copies of this patent may be obtained for five cents each, by addressing the "Commissioner of Patents, Washington, D. C."